United States Patent
Doing et al.

(10) Patent No.: US 7,305,586 B2
(45) Date of Patent: *Dec. 4, 2007

(54) ACCESSING AND MANIPULATING MICROPROCESSOR STATE

(75) Inventors: Richard William Doing, Raleigh, NC (US); Michael Stephen Floyd, Austin, TX (US); Ronald Nick Kalla, Round Rock, TX (US); John Wesley Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 387 days.

This patent is subject to a terminal disclaimer.

(21) Appl. No.: 10/424,485

(22) Filed: Apr. 25, 2003

(65) Prior Publication Data

US 2004/0225917 A1    Nov. 11, 2004

(51) Int. Cl.
*G06F 11/00* (2006.01)
(52) U.S. Cl. .......................................... 714/28; 714/35
(58) Field of Classification Search .................. 714/28, 714/35
See application file for complete search history.

(56) References Cited

U.S. PATENT DOCUMENTS

| | | | |
|---|---|---|---|
| 5,479,652 A * | 12/1995 | Dreyer et al. ................. 714/30 |
| 5,519,715 A * | 5/1996 | Hao et al. ..................... 714/727 |
| 6,055,656 A * | 4/2000 | Wilson et al. ............... 714/724 |
| 6,629,268 B1 * | 9/2003 | Arimilli et al. ................ 714/42 |
| 6,859,891 B2 * | 2/2005 | Edwards et al. .............. 714/30 |
| 6,963,963 B2 * | 11/2005 | Moyer ......................... 711/202 |
| 2002/0059542 A1 * | 5/2002 | Debling ........................ 714/28 |

* cited by examiner

*Primary Examiner*—Scott Baderman
*Assistant Examiner*—Brian Assessor
(74) *Attorney, Agent, or Firm*—Casimer K. Salys; Anthony V. S. England

(57) ABSTRACT

A microprocessor includes an externally accessible port and a serial communication bus connected to the port. An execution pipeline of the processor includes a pipeline satellite circuit coupling the pipeline to the bus. The satellite enables an external agent to provide an instruction directly to the pipeline via the serial bus. A dedicated register and register satellite circuit couple the register to the communication bus. The execution pipeline can access the dedicated register during execution of the instruction. In this manner, the satellite circuits enable the external agent to access architected state. The communication bus enables access to the satellites while a system clock to the processor remains active. In one embodiment, the pipeline satellite accesses the pipeline "downstream" of the decode stage such that the set of instructions that may be "rammed" into the pipeline is not limited to the set of instructions that the decode stage can generate.

15 Claims, 8 Drawing Sheets

TO FIG. 6B

DATA PACKET FORMAT

ADDRESS PACKET FORMAT

ACCESSING AND MANIPULATING MICROPROCESSOR STATE

BACKGROUND

1. Field of the Present Invention

The present invention generally relates to the field of microprocessors and more particularly to the architectural state of a microprocessor and mechanisms for accessing and altering a microprocessor's state.

2. History of Related Art

Microprocessors include various internal facilities that enable the microprocessor to perform desired functions. These facilities include general purpose registers (GPRs), floating point registers (FPRs), and special purposes registers (SPRs). In addition to these architected facilities, microprocessors typically employ various internal registers, buffers, and other circuits to support the execution of instruction code. These facilities include, for example, the Next Instruction Address (NIA), which indicates the address of the next instruction to be fetched from instruction memory, various stacks that facilitate the execution of layered code (subroutines) and other features.

The values stored in all of these various registers at any one time are referred to as the microprocessor's state. Generally, a microprocessor's state information is not externally accessible. Although it would be theoretically possible to incorporate externally accessible signal pins, for example, to allow programmers, designers, test engineers, and others to determine a machine's state, the number of pins required to convey even a small portion of a device's state would greatly exceed the number of pins available in any packaging configuration.

To address this problem, the Joint Test Action Group (JTAG) standard, as specified in IEEE 1149.1, has been adopted by manufacturers of VLSI devices to provide a relatively simple means of accessing state information. As JTAG is implemented with respect to integrated circuits, a Test Access Port (TAP) employing four pins enables one to serially access or "long scan" at least some of a device's internal registers. In a "long scan" test, information is serially shifted along a series of predefined latches referred to as a scan chain. In this manner, information can be read from or written to these registers by clocking the desired data to or from the appropriate register. While the JTAG long scan mechanism is useful and relatively simple to implement into an integrated circuit design, its functionality is limited. Among the most significant limitations of conventional JTAG long scanning is the requirement to halt system clocks. Long scanning is achieved by incorporating an alternative path through the registers or latches in the scan chain. Data is shifted along the scan chain under control of a test clock. If the test clock and system clock(s) are running simultaneously, the state of the registers on the scan chain will be indeterminate. Halting system clocks is undesirable because substantially all systems associated with the microprocessor rely on the system clocks. When the system clocks are halted, the system is substantially shutdown thereby making it difficult to restart the system. It would be desirable to implement a mechanism that provided the internal access contemplated by JTAG without shutting down the system.

SUMMARY OF THE INVENTION

The problems identified above are in large part addressed in a microprocessor that incorporates a communication bus and dedicated circuitry located at desired functional locations within the microprocessor. An external agent, such as a service processor, can provide an instruction directly to an execution pipeline in the microprocessor using the communication bus. A dedicated register is also made accessible to the communication bus. Using the combination of a dedicated register and an externally accessible execution pipeline, the service processor is able to read and write any of the microprocessor's architected resources. As an example, the service processor could provide or "ram" the functional equivalent of a move instruction onto the execution pipeline via the communication bus to move the contents of an architected register to the dedicated register. When this instruction completes in the execution pipeline, the dedicated register contains the contents of the architected register. The dedicated register may then be read by the external agent to discover the contents of the architected register. Conversely, the external agent could, for example, write a value to the dedicated register and ram a move instruction into the execution pipeline to move the contents of the dedicated register to any of the architected registers thereby enabling a user to write the architected state. In addition, the microprocessor may be configured to support rammed instructions that are extensions of or otherwise outside the scope of the microprocessor's assembler level instruction set. Using these extended instruction sets, registers and buffers that are not otherwise accessible via software are made accessible to an external agent.

In one embodiment, the communication protocol, referred to herein as a scan communication (SCOM) bus, that enables this functionality is driven by the system clock rather than a dedicated and typically slow test clock. SCOM extends the capabilities of JTAG via the JTAG instruction register (IR) by incorporating circuitry that provides a parallel path to selected hardware elements in a device. Because this SCOM path operates under system clock controls, SCOM beneficially enables operation of the communication protocol without having to shut down the rest of the system. Moreover, because clocks are running to the rest of the system, other processors in the system that are still running and have access to the SCOM facility via assembly code to send read/write commands to the SCOM satellites can also act as external agents to initialize, change, or read the state of a given processor in the system. This functionality enables supervisory software such as a Hypervisor in control of the system can perform this ramming operation.

BRIEF DESCRIPTION OF THE DRAWINGS

Other objects and advantages of the invention will become apparent upon reading the following detailed description and upon reference to the accompanying drawings in which:

FIGS. 7A-7B, depict format of a data packet and address packet that may be used to communicate information on a two-wire serial bus such that positive acknowledgment may be generated by various control units in accordance with a preferred embodiment of the present invention.

Figure 1:
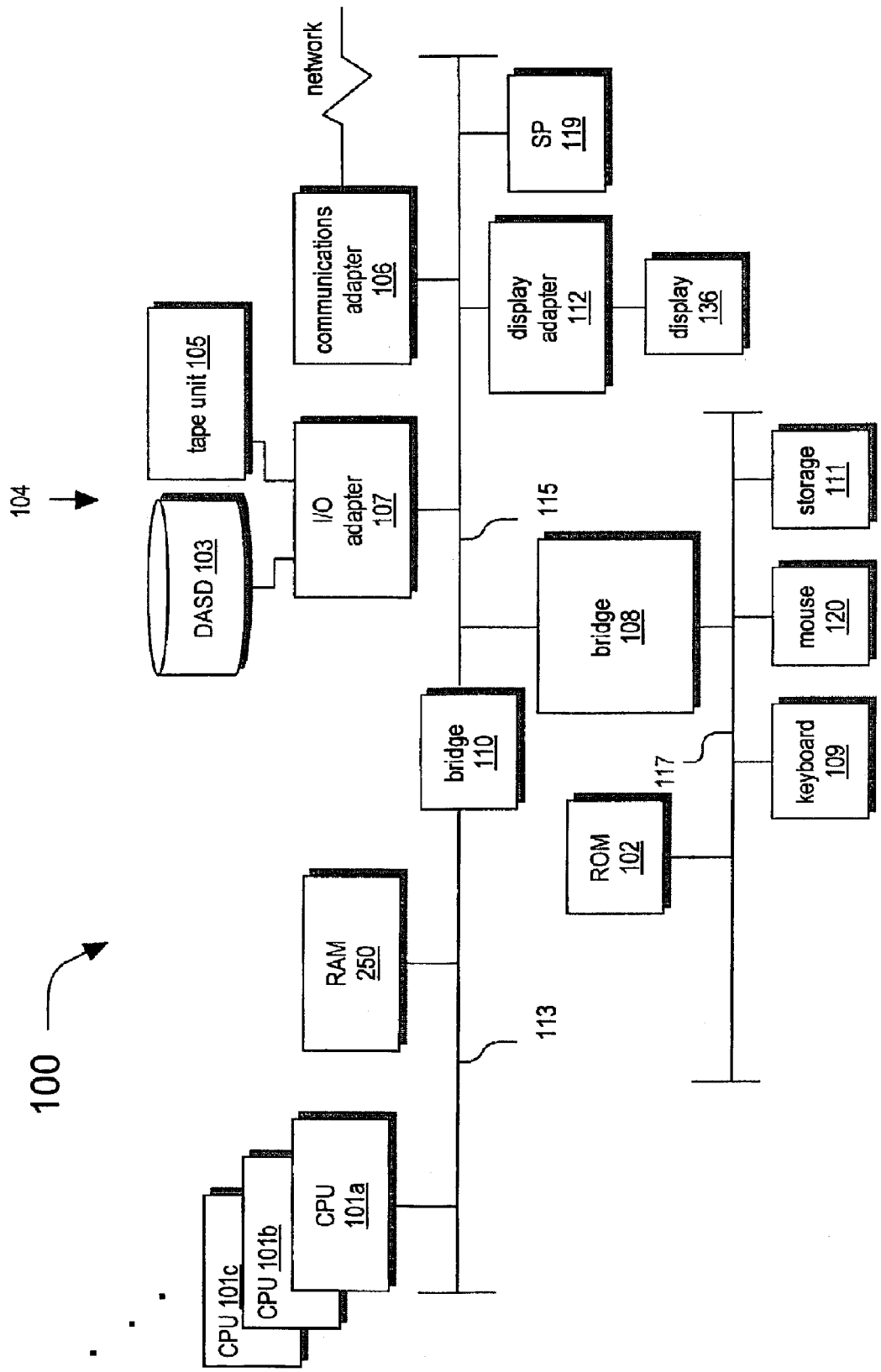
FIG. 1 is a block diagram of selected elements of a data processing system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention contemplates a method and mechanism providing external access to microprocessor state information. An external port or interface is employed in conjunction with dedicated circuitry to enable a user to provide or "ram" instructions directly into the execution stage of a processor pipeline. In addition, a dedicated register, accessible via the interface is added to the processor. This register may be designated as a source or destination register for an instruction that is jammed into the pipeline. Using the interface, the dedicated register, and appropriate register move instructions, the user can read or write the state of any of the processor's architected registers. Additionally, the mechanism may be used to access non-architected state such as a next instruction address register.

Referring now to FIG. 1, an embodiment of a data processing system 100 according to the present invention is depicted. System 100 includes one or more central processing units (processors) 101*a*, 101*b*, 101*c*, etc. (collectively or generically referred to as processor(s) 101. In one embodiment, each processor 101 is implemented as a superscalar, reduced instruction set computer (RISC) microprocessor. Additional information concerning RISC processors generally is available in C. May et al. Ed., *PowerPC Architecture: A Specification for a New Family of RISC Processors*, (Morgan Kaufmann, 1994 2d edition). As depicted in FIG. 1, processor(s) 101 are coupled to a system memory 250 via system bus 113. Those skilled in the design of microprocessor based systems will appreciate that this simplified representation omits an intervening memory controller.

A peripheral bus bridge 110 connects system bus 113 to a peripheral bus 115 representing, for example, a Peripheral Control Interface (PCI) bus. An I/O adapter 107 such as a SCSI controller connects bus 115 with mass storage devices 104 including a direct access storage device (DASD) 103 and/or a tape storage drive 105. A communications adapter or network interface card 106 coupled to the peripheral bus 115 links the system 100 with an external network enabling the system to communicate with other such systems. Display monitor 136 is connected to system bus 113 by display adapter 112, which may include a video controller and a graphics adapter to improve the performance of graphics intensive applications.

A service processor 119 connected to bus 115 provides fault detection, reporting, and correction facilities and other management functionality to system 100. Service processor 119 is configurable to monitor and reset the system's power supplies, temperature sensors, and cooling fans. In one embodiment, service processor 119 is implemented as an adapter card such as a PCI card connected to peripheral bus 115. Service processor 119 may receive a power signal that is distinct from power supplied to the remaining portions of system 100 such that service processor 119 can remain functional while processors 101 and other system facilities are powered down.

Additional input/output devices are shown as connected to bus 115 via a bridge 108 and a second peripheral bus 117 (an ISA bus, for example). A keyboard 109, mouse 120, and removable storage drive 111 are all linked to bus 117. A read-only-memory (ROM) 102 coupled to peripheral bus 117 includes a basic input/output system (BIOS) that defines base level controls for the system's devices and is used to boot the system to a known state following a system reset.

Thus, as configured in FIG. 1, system 100 includes processing means in the form of processors 101, storage means including system memory 250 and mass storage 104, input means such as keyboard 109 and mouse 110, and output means including display 136. A portion of system memory 250 and mass storage 104 collectively store an operating system to coordinate the functions of the various components shown in FIG. 1.

Figure 2:
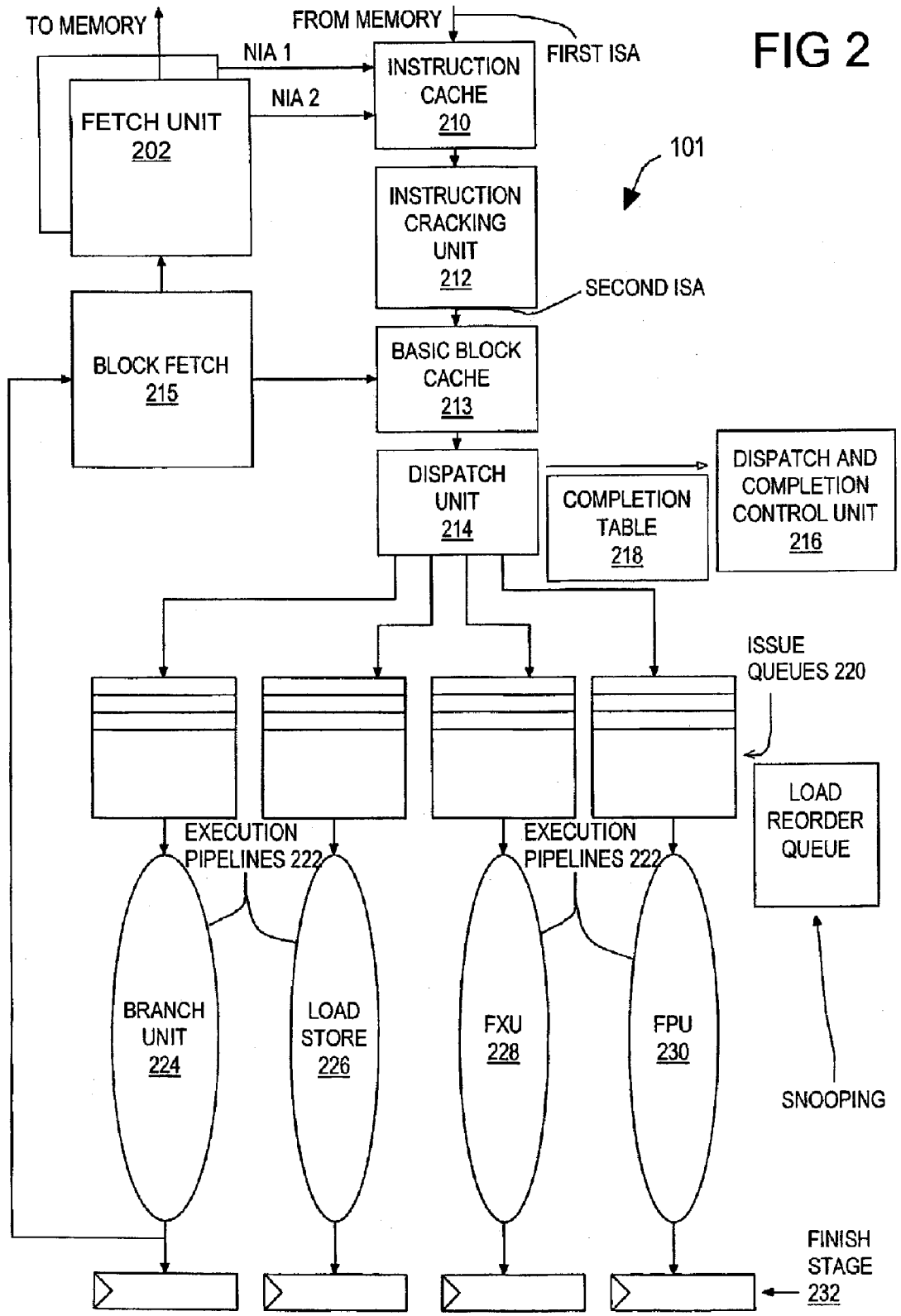
FIG. 2 is a block diagram of selected elements of a microprocessor according to the present invention and suitable for use in the system of FIG. 1.

Turning now to FIG. 2, a block diagram of selected elements of a processor 101 according to one embodiment of the present invention is illustrated. Processor 101 as depicted in FIG. 2 includes at least one instruction fetch unit 202 suitable for generating a next instruction address (NIA) indicating the next instruction to be fetched. The NIA generated by fetch unit 202 is provided to an instruction cache 210. Fetch unit 202 may include branch prediction logic that, as its name suggests, is adapted to make an informed prediction of the outcome of a decision that effects the program execution flow. The ability to correctly predict branch decisions is a significant factor in the overall ability of processor 101 to achieve improved performance by executing instructions speculatively and out-of-order.

The depicted embodiment of processor 101 includes a pair of fetch units 202. In this embodiment, each fetch unit may retrieve code for a corresponding stream of code or "thread." The two threads execute on a common set of resources. Thread tags are attached to the instructions indicating to which thread a particular instruction belongs. Dual threaded processing offers potentially improved processing performance by increasing opportunities for instruction level parallelism.

The NIA's generated by fetch unit(s) 202 are provided to an instruction cache 210, which contains a subset of the contents of system memory in a high speed storage facility. The instructions stored in instruction cache 210 are formatted to or compliant with a first instructions set such as, for example, the PowerPC instruction set. Detailed information regarding the PowerPC® instruction set is available in the *PowerPC 620 RISC Microprocessor User's Manual* available from Motorola, Inc. (Order No. MPC620UM/AD), which is incorporated by reference herein. If an NIA generated by fetch unit(s) 202 corresponds to a system memory address that is currently replicated in instruction cache 210 (i.e., the NIA "hits" in instruction cache 210), instruction cache 210 forwards the corresponding instruction to cracking unit 212. If the NIA generated by fetch unit 202 does not currently reside in instruction cache 210 (i.e., the NIA misses in instruction cache 210), the corresponding instruction must be fetched from a lower level cache memory (not shown) or from system memory 250.

The decode stage of the depicted processor employs cracking facilities unit 212 to modify an incoming instruction stream to produce a set of instructions optimized for executing in an underlying execution pipeline at high operating frequencies (i.e., operating frequencies exceeding 1 GHz). In one embodiment, for example, cracking unit 212 receives instructions in a first, 32-bit wide instruction format such as the PowerPC® instruction set and converts the instructions to a second instruction format that facilitates execution in a high speed execution unit operating in the gigahertz frequency range and beyond. The second format of the instructions generated by cracking unit 212 may be wider than the first instruction format. In this case, the second instruction format may replace, as an example, references or operands that are implied in the first format with explicit operand references. In one embodiment, for example, the instructions generated by cracking unit 212 are 64 or more bits wide.

The depicted embodiment of cracking unit 212, in addition to modifying instructions formats, organizes fetched instructions into instruction groups or basic blocks. As used herein, a basic block is a block of code that is guaranteed to execute sequentially and is typically terminated by a branch instruction. Organizing instructions into basic blocks facilitates high speed execution by, among other things, simplifying the logic needed to maintain rename register mapping and completion tables for a large number of in-flight instructions.

The basic blocks generated by cracking unit 212 are stored in a basic block cache 213 with the address of the first instruction in the block serving as the basic block's address. In this way, basic block cache 213 stores recently used basic blocks in a manner functionally similar to the storage of recently accessed instructions in instruction cache 210. Basic block cache 213 works in conjunction with a block fetch unit 215 analogous to the manner in which fetch unit 202 works with instruction cache 210. Block fetch unit 215 generates an instruction address that is provided to basic block cache 213. The instruction address provided by block fetch unit 215 is compared against the addresses of basic blocks in basic block cache 213. If the instruction address provided by block fetch unit 215 hits in basic block cache 213, the appropriate basic block is forwarded to dispatch unit 214. If the address provided by block fetch unit 215 misses in basic block cache 213, the instruction address is fed back to fetch unit 202 to retrieve the appropriate instructions from instruction cache 210.

The depicted embodiment of processor 101 further indicates a dispatch unit 214. Dispatch unit 214 is responsible for ensuring that all necessary resources are available prior to forwarding the instructions in each instruction group to their appropriate issue queues 220. In addition, dispatch unit 214 communicates with dispatch and completion control logic 216 to keep track of the order in which instructions were issued and the completion status of these instructions to facilitate out-of-order execution. In association with dispatch and completion control logic 216, a completion table 218 is utilized in one embodiment of the present invention to track the status of issued instruction groups.

Instructions are issued from dispatch unit 214 to issue queues 220 where they await execution in corresponding execution pipes 222. Processor 101 may include a variety of types of executions pipes, each designed to execute a subset of the processor's instruction set. In one embodiment, execution pipes 222 may include a branch unit pipeline 224, a load store pipeline 226, a fixed point arithmetic unit 228, and a floating point unit 230. Each execution pipe 222 may comprise two or more pipeline stages. Instructions stored in issue queues 220 may be issued to execution pipes 222 using any of a variety of issue priority algorithms. In one embodiment, for example, the oldest pending instruction in an issue queue 220 is the next instruction issued to execution pipes 222. Prior to issue, the destination register operand of the instruction is assigned to an available rename GPR (or FPR depending upon the instruction type). When an instruction is ultimately forwarded from issue queues 220 to the appropriate execution pipe, the execution pipe performs the appropriate operation as indicated by the instruction's opcode and writes the instruction's result to the instruction's rename GPR by the time the instruction reaches a finish stage (indicated by reference numeral 232) of the pipeline. A mapping is maintained between the rename GPRs and their corresponding architected registers. When all instructions in an instruction group (and all instructions in younger instruction groups) finish without generating an exception, a completion pointer in the completion table 218 is incremented to the next instruction group. When the completion pointer is incremented to a new instruction group, the rename registers associated with the instructions in the old instruction group are released thereby committing the results of the instructions in the old instruction group. If one or more instructions older than a finished (but not yet committed) instruction generates an exception, the instruction generating the exception and all younger instructions are flushed and a rename recovery routine is invoked to return the GPR mapping to the last known valid state.

If a predicted branch is not taken (branch misprediction), the instructions pending in executions pipes 222 and issue queues 220 are flushed. In addition, a pointer in the basic block cache entry associated with the mispredicted branch is updated to reflect the most recent branch taken.

Figure 3:
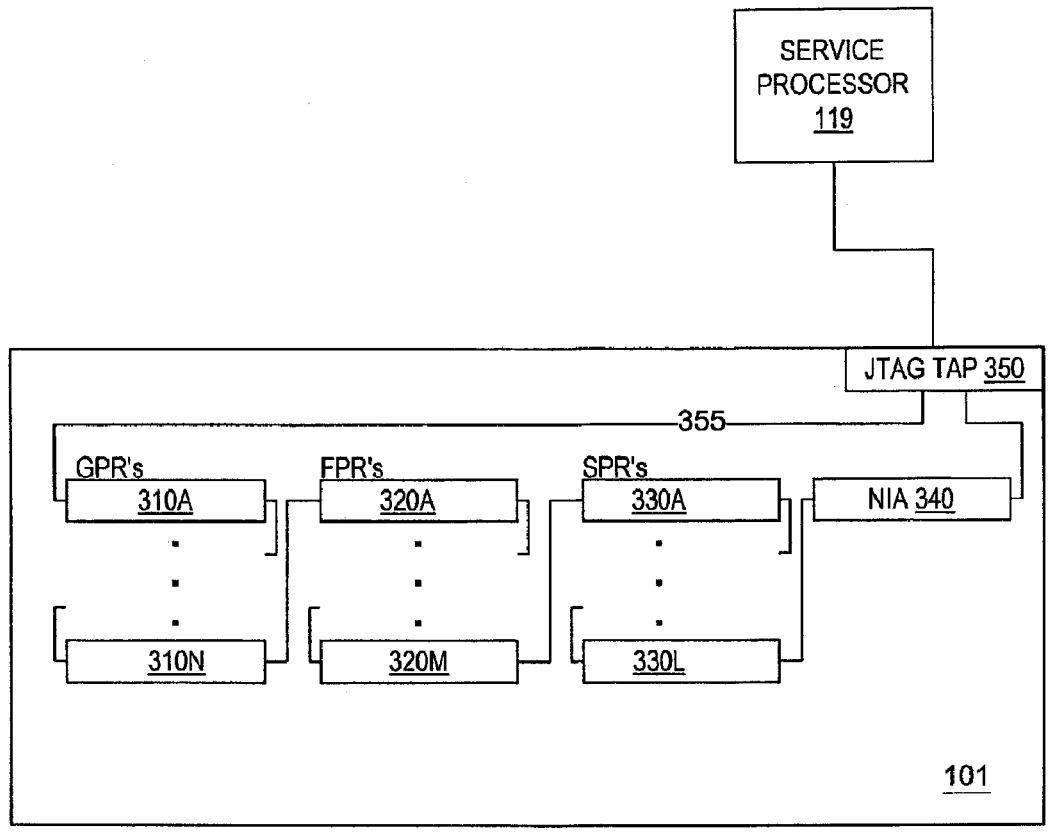
FIG. 3 is a conceptual representation of selected state elements of the microprocessor of FIG. 2.
Figure 4:
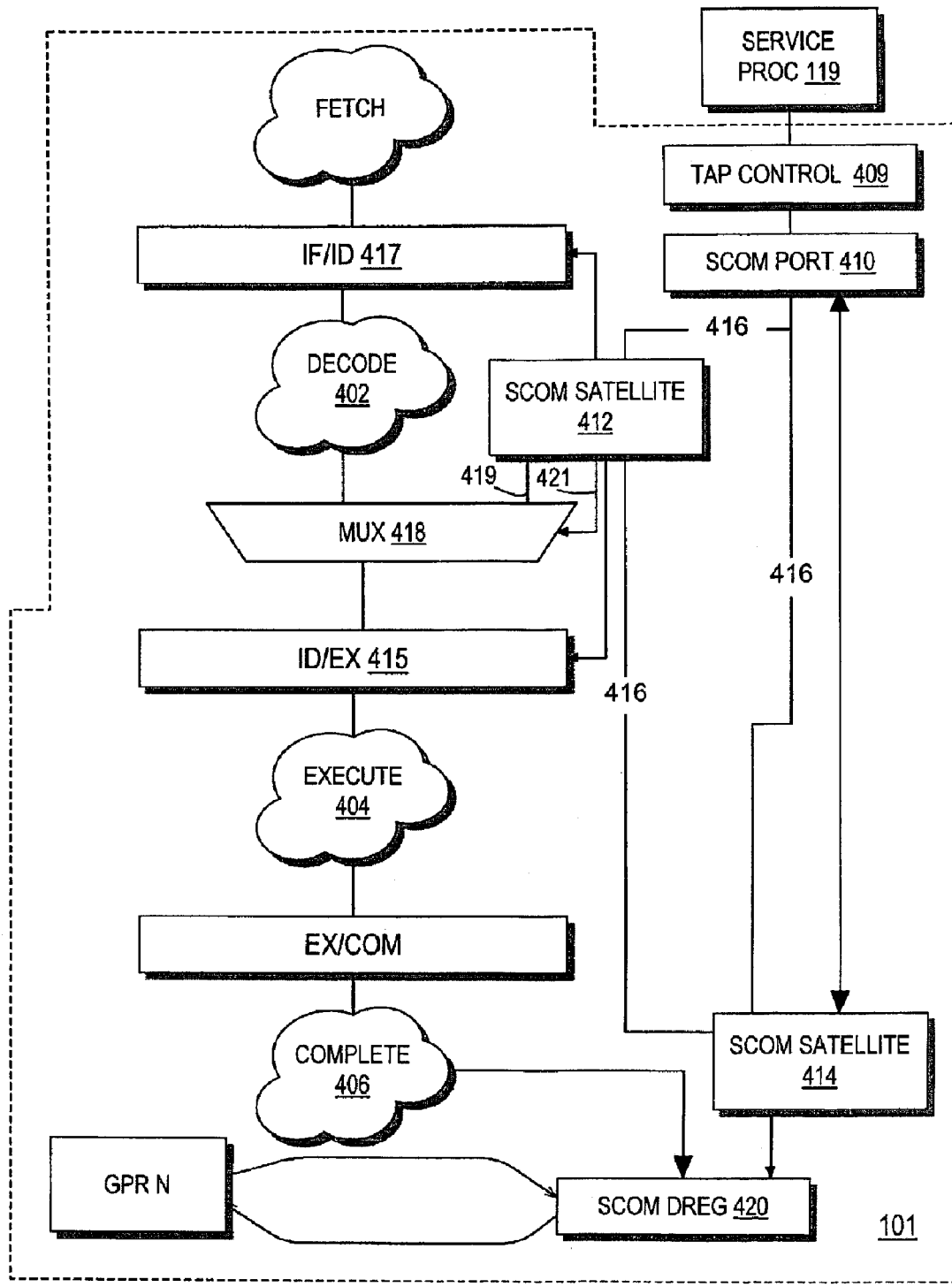
FIG. 4 illustrates selected elements of a microprocessor according to the present invention emphasizing the processor's ability to enable access to internal state information.

Referring now to FIG. 3 and FIG. 4, selected elements of processor 101 according to the present invention are presented to illustrate the processor's ability to externally access architected state information as well as other information internal to the processor. FIG. 3 illustrates the elements of processor 101 that represent the processor's architected state. This state includes the processor's general purposes registers 310A through 310N (generically or collectively referred to as GPR(s) 310), floating point registers 320A through 320M (generically or collectively referred to as FPR(s) 320), and special purpose registers 330A through 330L (SPR(s) 330). In addition to these architected features, processor 101 includes registers and buffers that, although not strictly included in the processor's architected state, are important to the processor's operation. Among this set of microcoded state information is the processor's NIA registers 340 and other elements including, for example, the processor's lookaside buffers.

External accessibility to internal state of processors 101 is provided according to conventional techniques using a JTAG compliant serial bus. JTAG is a serial bus protocol designed for use in debugging devices at the chip, board and system level. More detailed information regarding JTAG is specified in IEEE 1194.1. In the embodiment depicted in FIG. 3, service processor 119 or another suitable external agent is configured to access internal state of processor 101 via a JTAG test access port (TAP) 350. The TAP includes 4 dedicated signal wires specified by JTAG. Using JTAG serial bus 355 (which includes the JTAG test data out (TDO) and test data in (TDI) signals, and a test clock (not shown)), a user is able to "scan" data into (i.e., write) and out of (i.e., read) the internal registers of processor 101. Although this functionality is highly beneficial, a significant drawback of the JTAG scan mechanism is the processor's system clocks must be shut down to invoke the JTAG facilities. Shutting down system clocks is highly disruptive to the system as a whole. In a multiprocessor configuration, for example, shutting down the system clock on one of the processors would typically result in all processors on the complex being shut down as well.

Referring to FIG. 4, selected elements of processor 101 are illustrated to emphasize the ability to achieve JTAG-like access to internal state using a high speed serial protocol that enables the user to maintain system clocks while accessing the internal state. The elements of a high speed serial protocol suitable for use in the present invention are described in U.S. Pat. No. 6,529,979 *Method and Apparatus for High Speed Serial Communications Bus Protocol with Positive Acknowledgement* [hereinafter the '979 patent], which is incorporated by reference herein. The serial communication (SCOM) bus described in the '979 patent extends the functionality of JTAG by incorporating, among other elements, address in and out signals to accompany the data in and out signals, and the incorporation of SCOM "satellites" to enable high speed (i.e., system clock speed) communication with internal elements of the processor.

FIG. 4 illustrates selected elements of a pipeline stage of processor 101. The depicted pipeline stage is representative of any of the pipeline stages 224, 226, 228, and 230 depicted in FIG. 2. It will be appreciated by those skilled in the field of microprocessor design that processor pipelines typically include a series of pipeline registers or latches that define pipeline stage boundaries. The exemplary pipeline depicted in FIG. 4 includes four pipeline stages, namely, an instruction fetch stage, an instruction decode stage, an execution stage, and a completion stage. These stages are well known in the field. See, e.g., Hennessy and Patterson, *Computer Architecture A Quantitative Approach*, pp. 127-136, (Morgan Kaufmann 2d. Ed. 1996).

As depicted in FIG. 4, processor 101 according to the present invention includes an SCOM port 410 that is connected to an external agent or master such as service processor 119 through an intermediate TAP controller 409, that preferably complies with JTAG. TAP controller 409 provides an SCOM address and, in the case of a write instruction, data to SCOM port 410. In addition to SCOM port 410, the depicted embodiment of processor 101 includes SCOM satellites 412 and 414 and a dedicated SCOM register identified as SCOM DREG 420. SCOM satellites 412 and 414 provide external accessibility, via SCOM bus 416, to selected facilities of processor 101. In the depicted embodiment, for example, SCOM satellite 412 provides external access to a multiplexer 418. An output of multiplexer 418 provides an input to the pipeline register 415 between an instruction decode stage 402 and an execution stage 404 of the pipeline. Satellite 414, on the other hand, enables external access to the dedicated SCOM DREG 420.

Figure 5:
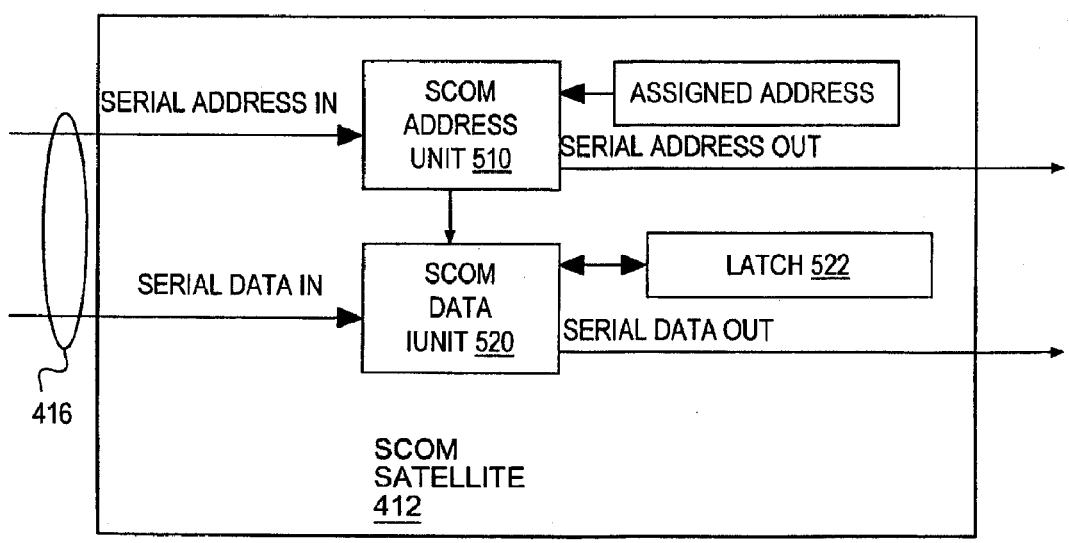
FIG. 5 illustrates additional detail of externally accessible satellite circuits suitable for use in the processor of FIG. 4.

The SCOM satellites 412 and 414, as shown in FIG. 5, include a data unit 520 and an address unit 510. Data unit 520 and address unit 510 include serial-to-parallel circuitry that is capable of receiving information or data received via a serial line such as the serial address and data lines of SCOM bus 416 and converting it to parallel information that may then be provided to a latch, register, buffer, or other feature (represented by reference numeral) of processor 101 that requires parallel information. Address unit 510 includes a comparator that determines a match address provided via SCOM bus 416 and an assigned address 524. Each SCOM satellite includes a unique assigned address.

Using an external agent such as service processor 119, the depicted embodiment of processor 101 enables a user to direct write into the decode/execution register 415 of a processor pipeline. Because register 415 represents the pipeline stage register that receives decoded instructions from decode stage 402, it will be appreciated that satellite 412 enables a user to provide a decoded instruction of the user's choice directly into the pipeline. Thus, any instruction supported by the architecture may be written directly to pipeline register 415 using the SCOM bus 416. The instructions that may be provided to register 415 are discussed in additional detail below. In the preferred embodiment, SCOM bus 416 is operable while system clocks to the remainder of processor 101 are active.

In conjunction with satellite 412 that enables access to the front end of a processor pipeline, the depicted embodiment of processor 101 includes the dedicated SCOM DREG 420 and an associated satellite 414. From a functional perspective, SCOM DREG 420 may be thought of as an architected register in the processor's register file that is typically updated with the result of an instruction during a completion stage also referred to as a writeback stage. Accordingly, FIG. 4 illustrates SCOM DREG 420 as being accessed in a completion stage 406 of the pipeline. Additionally, however, the SCOM satellite 414 provides external SCOM access to SCOM DREG 420. Thus, SCOM DREG 420 may be accessed during a completion stage of an instruction executing in the pipeline or directly by an external agent.

Using the dedicated register and the SCOM facilities as depicted in FIG. 4, processor 101 enables external access to the architected state of processor 101 in the following manner. A user wishing to read the state of a particular GPR, for example, can use service processor 119 to provide or "ram" a register move instruction into the processor pipeline using satellite 412.

The user will first stop the normal execution of instructions using SCOM commands. In one embodiment, SCOM satellite 412 is enabled to quiesce or halt the normal execution of an instruction sequence by halting the IF/ID stage register 417, the ID/EX stage register 415, or both. In an embodiment of processor 101 that employs dual NIA registers to enable dual threaded execution as described above with respect to FIG. 2, SCOM satellite 412 is preferably enabled to quiesce one thread via its corresponding NIA while the other thread continues to execute normally. As depicted in FIG. 4, processor 101 includes a multiplexer 418 that gates the input to ID/EX stage register 415. SCOM satellite 412 provides an input 419 and a select signal 421 to multiplexer 418. When SCOM satellite 412 asserts select signal 421, multiplexer 418 gates the input 419 provided via SCOM PORT 410 to ID/EX stage register 415 for execution in the pipeline thereby enabling the user to provide instructions directly into the pipeline execution stage. In a variation of the depicted embodiment, multiplexer 418 is located between a first portion of decode logic 402 (the "predecode" portion) and a second portion of decode logic 402. In this embodiment, the predecode portion of logic 402 filters out instructions that are not supported by the architecture, while the actual converting of instructions from, for example, a PowerPC® instruction format to an internal format is performed after multiplexer 418. This embodiment enables users to specify the instructions that they want to ram into the pipeline in the conventional format while simultaneously enabling users to use instruction set extensions, as described below, that would otherwise be filtered out by the predecode logic.

Using these instruction ramming elements, the user is able to indicate the desired GPR as the source operand for the rammed instruction and the SCOM DREG 420 as the destination register. The designation of SCOM DREG 420 may be explicit in the rammed instruction or may be implied by, for example, the internal coding of the opcode. In any event, after ramming the instruction into the pipeline, the rammed instruction executes through the pipeline the same as any instruction that is fetched from instruction memory and decoded in the conventional manner. During the completion stage 406, SCOM DREG 420 is updated by the instruction to contain the contents of the GPR of interest. Using satellite 414, the user can then retrieve the information directly from SCOM DREG 420.

In a second example, a user wishing to write the contents of one or more architected registers can do so by writing the desired data into SCOM DREG 420 and then ramming a register move instruction that uses SCOM DREG as its source and the architected register of interest as the destination. When the RAM operation is complete, the user releases normal execution of the processor and normal instruction fetch, decode, and execution can resume.

The user can pre-program a sequence of instructions to read or write any state element conventionally accessible through the instructions supported by the architecture. This set of supported instruction preferably includes the majority assembler language instructions defined for the processor (i.e., the majority of instructions that can be produced by the conventional decode stage 402). While some of the more complicated instructions may not be supported by the SCOM mechanism, the SCOM elements may be used to "ram" a store that writes the desired opcode to scratch memory, "ram" the NIA to the scratch memory address, and then use an SCOM command to cause the processor to execute the instruction out of memory.

Moreover, because SCOM satellite 412 enables access to the post-decode stage of the processor pipeline, the user is not restricted to those instructions that are available to programmers. In an embodiment of processor 101, for example, that includes cracking unit 212 as described above, the internal operations (IOP's) generated by the cracking unit may be directly rammed into the pipeline by the user. In addition, the pipeline hardware may support execution of additional instructions that are only possible via SCOM bus 416. These additional instructions would include instructions that decode stage 402, including any cracking unit within the stage, is incapable of producing. Examples of such "non-supported" instructions include instructions that read/write the processor's NIA and segment lookaside buffers (SLB's). The ability to manipulate the NIA beneficially enables a user to alter program sequence flow directly while access to the lookaside buffers can allow a user to alter the translation of memory segments or observe the current translation context of the microprocessor.

Figure 6A:
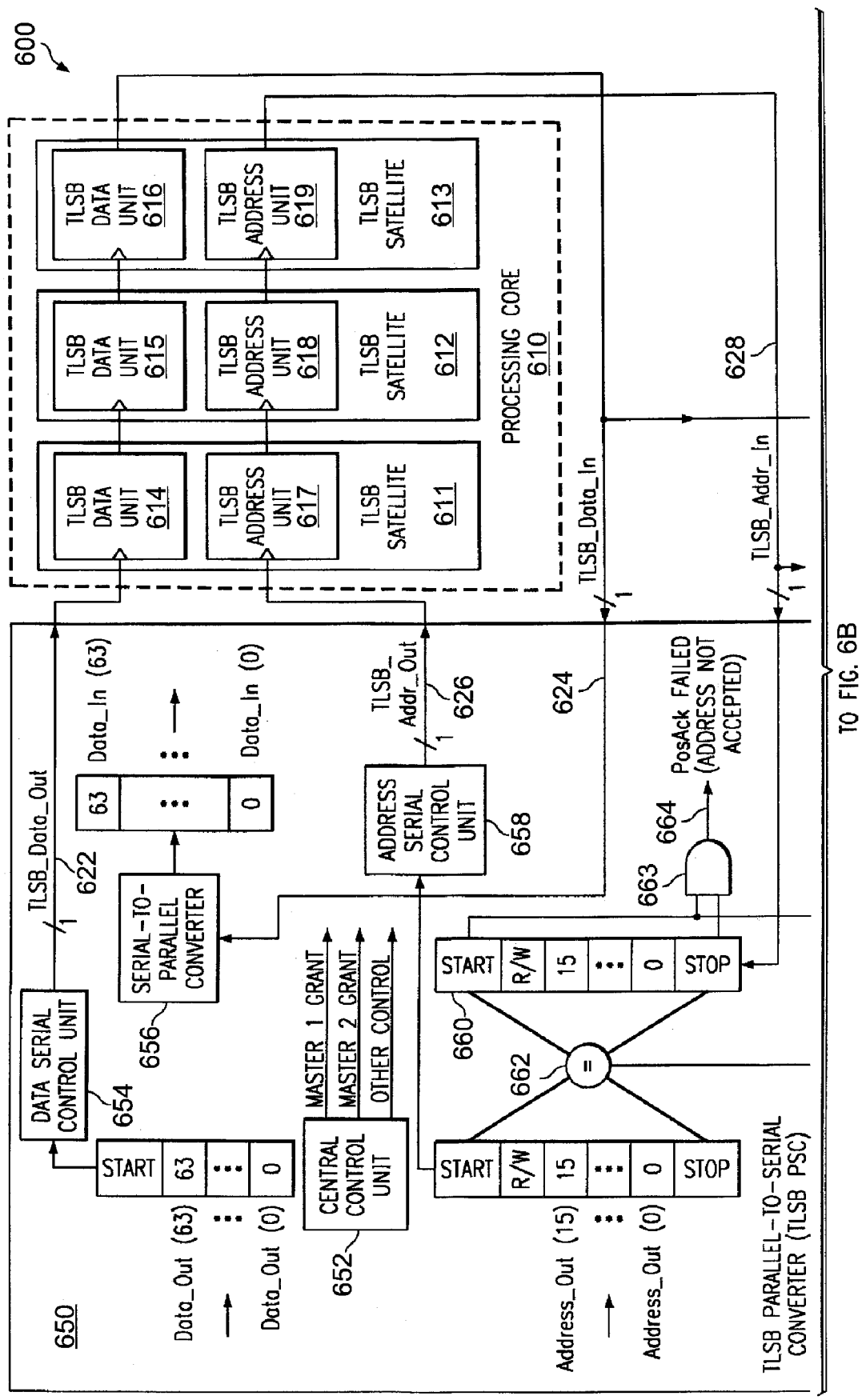
FIG. 6 depicts layout of a two-wire serial bus and various control units that provide functionality of a positive acknowledgment in accordance with a preferred embodiment of the present invention.
Figure 6B:
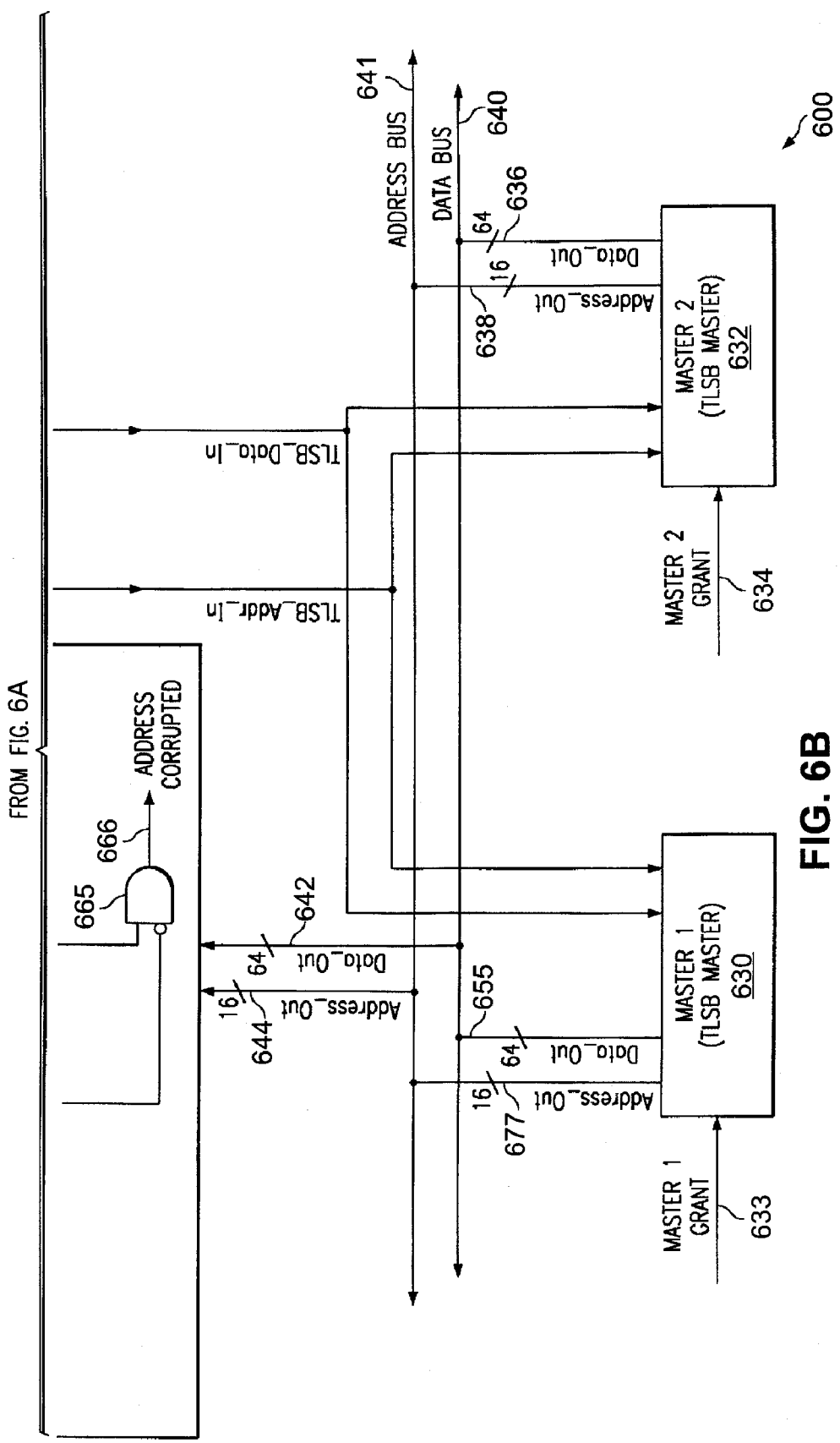

With reference now to FIG. 6, a block diagram depicts the layout of a two-wire serial bus and various control units that provide the functionality of a positive acknowledgment in accordance with a preferred embodiment of the present invention. FIG. 6 shows circuit 600 with a two-wire or two-line serial bus (TLSB) that may be daisy-chained through hundreds of serial bus interface units, called satellites, on a chip. The TLSB bus provides an efficient mechanism for reading and writing to the satellites on the chip for configuration, testing, and monitoring purposes, as explained in more detail below.

TLSB Parallel-to-Serial Converter (PSC) 650 is a TLSB master than controls access to the TLSB, which is a two-wire serial bus that daisy-chains through satellites 611-613. TLSB PSC 650 is located on the VLSI chip. The service processor may communicate with TLSB PSC 650 through a JTAG interface on the chip.

Additionally, TLSB PSC 650 may be located on a chip with multiple processor cores. A processor core may contain functionality similar to a central processing unit, and multiple processor cores are located on a single chip may share certain resources, such as on-chip caches, etc. In this configuration, a processor core may communicate with TLSB PSC 650 through an interface, such as shown in FIG. 6, where a processor core may act as a TLSB master 630 or 632. Commands may be given to TLSB PSC 650 through instructions executing on that processor core using special purpose registers dedicated for holding parallel data for placement on the serial interface. Software or firmware may read and write to these registers to cause commands to the sent to TLSB PSC 650. These same registers may then be read to discover TLSB communication errors. For example, the service processor could be notified of a positive acknowledgment error generated by a communication error on the TLSB, and the service processor may then read a register TLSB 650 to identify the type of error, etc. The generation of a positive acknowledgment error in accordance with a preferred embodiment of the present invention is provided in more detail further below.

As shown in the figure, satellites 611-613 are located throughout the VLSI chip including the processor cores. The number of supportable satellites depends on the system implementation, the amount of area of the chips connected to the TLSB dedicated to its functionality, and the functionality that is desired by the chip developers. Satellites 611-613 contain TLSB Data Units 614-616 and TLSB Address Units 617-619. A TLSB Data Unit within a satellite provides serial-to-parallel conversion of a data packet received from the TLSB and parallel-to-serial conversion of a data packet to be placed on the TLSB. A TLSB Address Unit within a satellite provides serial-to-parallel conversion of an address packet received from the TLSB and are responsible for implementing positive acknowledgment functionality.

The TLSB comprises a data line and an address line. The data line is shown as TLSB_Data_Out 622 output from TLSB PSC 650, daisy-chained through the satellites, and input back into TLSB PSC 650 as TLSB_Data_In 624. The address line is shown as TLSB_Addr_Out 626 and daisy-chained through the satellites, and input back into TLSB PSC 650 as TLSB_Addr_In 628.

The TLSB is tapped by TLSB masters 630 and 632. The TLSB is a resource that is available to a variety of components. Several data sources may be connected to the TLSB, and if so, an arbiter may be used to arbitrate for access to the TLSB. The arbiter may be located internally or externally to TLSB PSC 650. One or more of the masters may be driven by the service processor or may be under the control of software.

Masters 630 and 632 receive one-bit-wide serial inputs of address and data information from the TLSB via TLSB_Addr_In 628 and TLSB_Data_In 622. Masters 630 and 632 would contain a serial-to-parallel converter (not shown) to convert the data that is received serial into parallel format. Masters 630 and 632 receive a TLSB grant, such as grants 633 and 634, from TLSB PSC 650 that provide an indication that a master may start transferring data. Masters 630-632 output data packets on Data_Outs 635 and 636 address packets on Address_Outs 637 and 638 onto Data Bus 640 and Address Bus 641, which is then input into TLSB PSC 650.

TLSB PSC 650 receives the inputs as Data_Out 642 and Address_Out 644, respectively. In the example, the widths correspond to the size of the data and address packets to be placed on the TLSB, is 4 bits and 16 bits plus a read/write bit, respectively. The width of these lines may vary depending upon system implementation.

Alternatively, the masters may communicate with the TLSB PSC via a similar two-wire serial bus with similar parallel-to-serial conversion or serial-to-parallel conversion functionality, respectively.

The names of these inputs, Data Out 642 and Address_Out 644, should be viewed from the perspective of the masters as the direction of data is towards the satellites. In other words, the data and address received by TLSB PSC 650 will be converted from parallel format to serial format and output to the satellites. The satellites may receive data and then place data onto the TLSB, which is then fed back to TLSB PSC 650 as TLSB_Data_In 624 and TLSB_Addr_In 628, i.e., from the perspective of the masters, the direction of data is towards the masters.

TLSB PSC 650 also contains central control unit 652 for providing various control signals to the TLSB masters or for control signals within TLSB PSC 650. TLSB PSC 650 contains Data Serial Control Unit 654 that is used to place data packets onto the TLSB and Serial-to-Parallel Data Converter 656 that is used to receive incoming data packets from the TLSB. Although masters 630 and 632 have also received these data packets via the TLSB, these packets may be optionally provided to other components through a parallel interface for a variety of purposes if desired.

TLSB PSC 650 contains Address Serial Control Unit 658 that is used to place address packets onto the TLSB and Address Receipt Register 660 that is used to receive incoming address packets from the TLSB. Although masters 630 and 632 have also received these address packets via the TLSB, these packets may be optionally provided to other components through a parallel interface for a variety of purposes if desired.

TLSB PSC 650 receives address packets through TLSB_Addr_In 628, places the incoming address packet into Address Receipt Register 660, and determines whether there is a positive acknowledgment error. If so, then PosAckFailed signal 664 is generated, and the signal may be processed appropriately, such as by sending the error signal to the service processor. The manner in which the positive acknowledgment may be better understood in conjunction with the discussion below concerning the format of the address packet and the manner in which the satellites process the stop bit in an address packet. The start bit of the address packet demarcates the beginning of the address packet, which is fed as an input into AND gate 663, thereby providing a manner of selecting the AND gate. The complement of the stop bit from the address packet is also fed as an input into AND gate 663. Since the stop bit should have been stripped off by a satellite to acknowledge the receipt of the address packet, a logical "1" for a stop bit causes AND gate 663 in conjunction with a start bit of "1" to generate PosAckFailed signal 664.

Comparator 662 compares the address from the outgoing address packet as placed on the TLSB and the address from the incoming packet as received from the TLSB. The result of the comparison of the address packets is also fed into AND gate 665. The start bit demarcates the beginning of the address packet, which is fed as an input into AND gate 665, thereby providing a manner of selecting the AND gate. If the address has been corrupted, then AddressCorrupted signal 666 may be generated and processed in the appropriate manner.

Figure 7A:
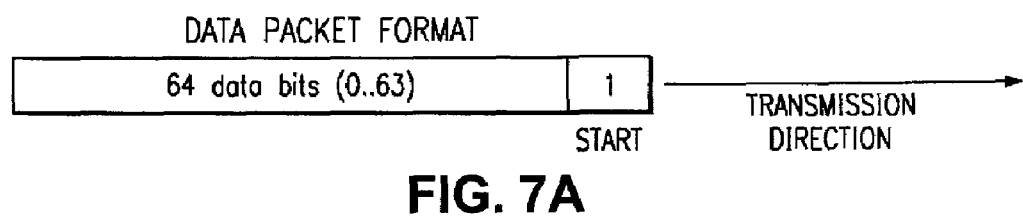
Figure 7A:
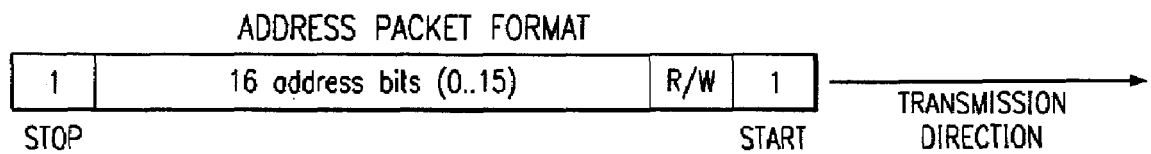

With reference now to FIGS. 7A-7B, diagrams depict the format of a data packet and address packet that may be used to communicate information on a two-wire serial bus such that positive acknowledgment may be generated by various control units in accordance with a preferred embodiment of the present invention.

As explained with respect to FIG. 6 above, the TLSB is a two-wire serial bus that daisy-chains through TLSB satellites, which contain serial-to-parallel converters, thereby providing two serial inputs to the serial-to-parallel converters. Data is transmitted on these serial lines in groups of bits referred to as packets. Address packets come in on a TLSB address input and data packets are received on a TLSB data input.

For simplicity, the serial-to-parallel converters rely on a transmission protocol that uses start bits for incoming packets. The address shift register, e.g., as would be present in TLSB Address Unit 617 in FIG. 6, constantly shifts, and the data shift register, e.g., as would be present in TLSB Data Unit 614 in FIG. 6, by default holds until there is an address match. Thus, the address shift register also needs a stop bit to indicate when to perform the address compare. When looking for a packet, the shift register constantly shifts until triggered, which would be caused in the address shift register by the start and stop bits both equal to "1" and caused in the data shift register by start bit equal to "1", at which time some action is initiated. When the address shift register triggers, the address is checked for a match with the satellite's TLSB ID, explained in more detail further below. For a TLSB Write, an address match initiates the data shift register to shift until triggered, at which time the contents are parallel-loaded into the data register. For a TLSB Read, an address match causes the data register to be parallel-loaded into the data Shifter and the data shifter to then begin shifting, which stops upon seeing an address start bit for the next transaction.

Figure 8:
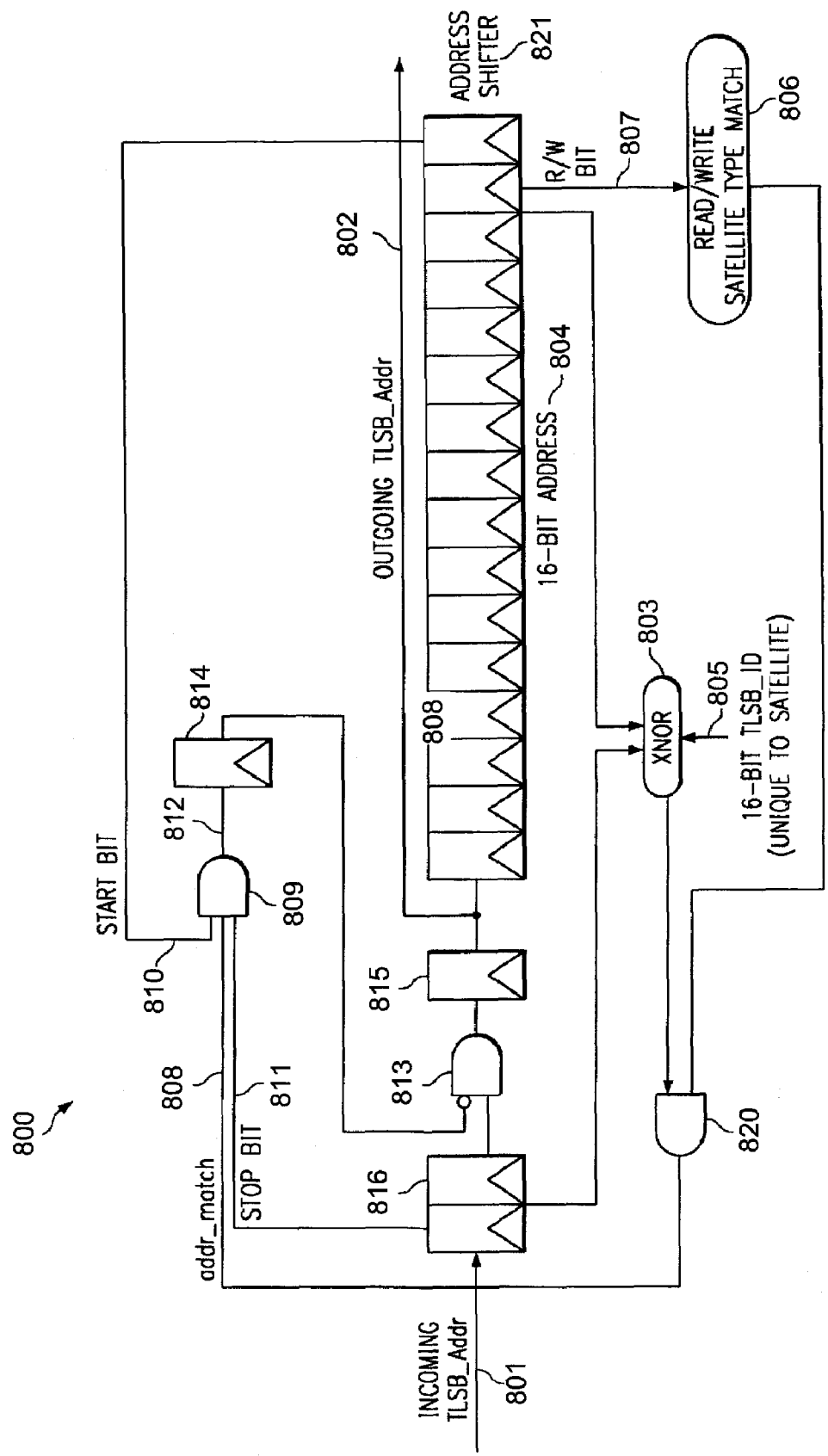
FIG. 8 a diagram depicts a logic circuit that generates positive acknowledgment using an address packet on a two-wire serial bus in accordance with a preferred embodiment of the present invention.

With reference now to FIG. 8, a diagram depicts a logic circuit that generates positive acknowledgment using an address packet on a two-wire serial bus in accordance with a preferred embodiment of the present invention.

Each serial-to-parallel converter is assigned a unique 16-bit TLSB_ID used to match against the incoming TLSB address. All converters latch the incoming TLSB Addr and TLSB_Data bits and re-send them unchanged, except for the address stop bit which is used for positive acknowledgment as explained below, three cycles later on the outgoing TLSB_Addr and TLSB_Data lines. This allows TLSB blocks in close proximity to be chained together by connecting the outgoing TLSB_Addr line of the first block to the incoming TLSB_Addr line of the next block. Similarly, the TLSB_Data lines may be chained together in the same fashion. The converters form a chain that loops back to the unit providing access to the TLSB, such as TLSB PSC 650 in FIG. 6.

An address packet is received by converter 800 and enters address shifter 821 on TLSB_Addr line 801, and the address packet is shifted out on TLSB_Addr line 802. When a converter has an address match, as provided by XNOR comparator 806 comparing 16-bit address 804 and the converter's or satellite's TLSB_ID 805, it gates off the stop bit from the address packet as it forwards it to the next converter in the chain. Since all converters have a unique address, it is the only converter that will match; all of the other converters, after they receive the address packet, will not match on that particular address packet. Even if there were some type of hardware or design error causing these converters to think that they had the same address, the cleared stop bit would prevent subsequent satellites from seeing a framed packet.

For a write operation, after address match 808 occurs, the next incoming data packet from the data serial bus will be captured. In the case of a read operation, the address match 808 causes a data packet to be generated by the satellite using the contents of its data register. A variety of means may be used to sequence the capturing the data on a write or the generation and sending of data on a read, such as a state machine or a data flow circuit depending upon system implementation.

The stop bit is gated off, i.e. set to zero, in the following manner. Read/Write satellite match unit 806 qualifies the address match such that read-only, write-only, and read/write satellites can be created. If one attempts to perform a write to a read-only address, the converter will not match due the output of read/write satellite-type match unit 806 blocking an address compare at AND gate 820. The TLSB_ID matches the unique TLSB identifier, as determined by XNOR 806, AND gate 820 generates addr_match signal 808 is provided to AND gate 809. If the complete address packet has been received, as determined by start bit 810 and stop bit 811 properly framing the address packet, AND gate 809 provides output 812 of "1", indicating that the address packet was completely and properly received. Output 812 is then negated by AND gate 816 to "strip out" the stop bit, thereby providing a positive acknowledgment indication. Latch 814 provides a one-cycle delay to ensure that output 812 is input into latch 815 on the cycle when the output of latch 816 would normally be input into latch 815.

Referring again to FIG. 6, TLSB PSC 650 can then check the address packet that returns from the loop with the packet it sent out on the chain by using comparator 662 and AND gates 663 and 665. The address plus R/W fields, starting with the start bit, should exactly match what was originally transmitted. If not, some form of hardware corruption occurred. Positive acknowledgment, indicating that the transaction was successful, occurs when the same address packet is returned with the stop bit missing. If the stop bit is still present in the address packet, it indicates that the transaction was unrecognized and therefore unsuccessful. This usually indicates a software error where the TLSB user code tried an invalid address. It could also indicate a hardware error in the target converter that caused it not to recognize its address.

Alternatively, the address packet may be modified in a variety of different manners to provide an indication of a positive acknowledgment, such as modifying other bits, adding other bits, or otherwise modifying the format of the address packet on the return path to the originator of the address packet.

It will be apparent to those skilled in the art having the benefit of this disclosure that the present invention contemplates a processor and system providing external access to microprocessor state without halting system clocks. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A microprocessor, comprising:
    a serial communication bus including an address line and a data line, the serial communication bus being within the processor and accessible through an external port;
    an execution pipeline;
    a pipeline satellite circuit coupling the pipeline to the address and data lines of the communication bus and being addressable on the communication bus via a first unique address, wherein the satellite circuit enables an external agent to provide an executable instruction directly to the execution pipeline via the communication bus; and
    a dedicated register and register satellite circuit, the register satellite circuit coupling the register to the communication bus via the address and data lines of the communication bus and being addressable on the communication bus via a second unique address, wherein the register satellite circuit and the pipeline satellite circuit each include a two-wire serial bus data unit and a two-wire serial bus address unit, wherein each two-wire serial bus address unit is connected to the address line, each two-wire serial bus data unit is connected to the data line, and wherein each two-wire serial address unit further includes:
        an address shift register for serially inputting and serially outputting an address packet on the address line;
        an address comparator for comparing an address from an address packet received on the address line to the unique address; and
        a positive acknowledgment generation unit for modifying the address packet to provide a positive acknowledgment of a receipt of the address packet to a source of the address packet; and
    wherein the execution pipeline is enabled to access the dedicated register during execution of the instruction and wherein the pipeline satellite circuit and the register satellite circuit enable access of architected registers in the microprocessor through the external port, wherein the pipeline satellite bypasses an instruction decode stage of the pipeline and enables direct access to an execution stage of the pipeline such that the set of instructions the execution pipeline is capable of executing is greater than the set of instructions capable of being produced by the decode stage., wherein the provided instruction enables access of a next instruction address (NIA) of the processors to control execution flow.

2. The processor of claim 1, wherein the serial communication bus enables access to the dedicated interface register and execution pipeline while a system clock to the processor remains active.

3. The processor of claim 1, wherein the provided instruction is an extended instruction not capable of being generated by the instruction decode stage.

4. A microprocessor, comprising:
    a serial communication bus including an address line and a data line, the serial communication bus being within the processor and accessible through an external port;
    a dedicated register coupled to a register satellite circuit, wherein the register satellite circuit is coupled to the address and data lines of the communication bus and addressable on the communication bus via a first unique address, so that the dedicated register is externally accessible via the communication port of the processor through the register satellite circuit;

means for externally selecting between an instruction decode stage of a multiple stage execution pipeline and the communication port as the source of instructions for an execution stage of the pipeline;

pipeline satellite means coupled to the address and data lines of the communication bus and addressable on the communication bus via a second unique address for externally providing an instruction to the pipeline, wherein the register satellite circuit and the pipeline satellite means each include a two-wire serial bus data unit and a two-wire serial bus address unit, wherein each two-wire serial bus address unit is connected to the address line, each two-wire serial bus data unit is connected to the data line, and wherein each two-wire serial address unit further includes:

an address shift register for serially inputting and serially outputting an address packet on the address line;

an address comparator for comparing an address from an address packet received on the address line to the unique address; and a positive acknowledgment generation unit for modifying the address packet to provide a positive acknowledgment of a receipt of the address packet to a source of the address packet; and wherein the pipeline satellite means includes means for designating the dedicated register as a first operand and an architected register of the microprocessor as a second operand, wherein information is transferred between the dedicated and architected registers when the provided instruction is executed., wherein the pipeline satellite means further includes means for designating a segment lookaside buffer (SLB) of the microprocessor as a second operand, wherein information is transferred between the dedicated register and the SLB to read or modify a current segment translation.

5. The microprocessor of claim 4, further comprising means for terminating execution of a currently executing instruction sequence.

6. The microprocessor of claim 5, wherein the means for terminating execution is further characterized as means for selectively shutting down a first execution thread while continuing to execute a second execution thread.

7. The microprocessor of claim 6, wherein the first execution thread is associated with a first next instruction address register (NIA) and the second execution thread is associated with a second NIA register.

8. The microprocessor of claim 4, wherein the means for providing an instruction to the pipeline are further characterized as means for providing an instruction to the pipeline while system clocks remain active.

9. The microprocessor of claim 4, wherein the communication port comprises an IEEE 1149.1 compliant test access port (TAP).

10. The microprocessor of claim 4, wherein the means for externally providing an instruction to the pipeline is further characterized as means for externally providing an instruction to an execution stage register of the pipeline.

11. The microprocessor of claim 10, wherein the means for externally providing an instruction to the pipeline further including means for designating a next instruction address (NIA) register of the microprocessor as a second operand, wherein information is transferred between the dedicated register and the NIA.

12. A method of accessing information in a microprocessor, wherein the microprocessor includes first and second stages of an execution pipeline and execution of an instruction sequence in the microprocessor includes the first stage passing an instruction to the second stage, the method comprising:

externally halting execution of the instruction sequence in the execution pipeline of the microprocessor and preempting the instruction from passing to the second stage from the first stage;

receiving an externally provided preemptive instruction by the second stage of the pipeline via a pipeline satellite from a communication port of the microprocessor, wherein the pipeline satellite includes a two-wire serial bus data unit and a two-wire serial bus address unit, the address and data units being coupled to the communication port by a serial bus having an address line and a data line, and wherein the receiving includes:

receiving a first address packet on the address line by a shift register of the address unit, wherein the received address packet includes a first address and the address packet is received as a serial sequence of bits on the address line;

comparing the received address by a comparator of the address unit to a unique address of the pipeline satellite; and modifying the address packet responsive to the comparing detecting a match between the received address and the unique address of the pipeline satellite;

wherein the method further comprises:

sending the modified address packet by the data unit to provide a positive acknowledgment of receipt;

designating, responsive to the preemptive instruction, a dedicated register, accessible via a register satellite from the communication port, as a first operand and an internal register of the microprocessor as a second operand, wherein information is transferred between the dedicated register and the internal register when the externally provided instruction is executed; and accessing the dedicated register via the register satellite from the communication port to read or modify the internal register, wherein the register satellite includes a two-wire serial bus data unit and a two-wire serial bus address unit, the register satellite address and data units being coupled to the communication port by a serial bus having an address line and a data line, and wherein the accessing includes:

receiving a second address packet on the address line by a shift register of the register satellite address unit, wherein the received second address packet includes a second address and the second address packet is received as a serial sequence of bits on the address line;

comparing the received second address by a comparator of the register satellite address unit to a unique address of the register satellite; and modifying the second address packet responsive to the comparing detecting a match between the received second address and the unique address of the register satellite; and wherein the method further comprises:

sending the modified second address packet by the register satellite data unit to provide a positive acknowledgment of receipt, wherein the internal register is inaccessible to a user via instructions of a certain instruction set of the microprocessor, the certain instruction set being a set of instructions that a decoder of the microprocessor is capable of decoding.

13. The method of claim 12, wherein externally halting execution of the instruction sequence and externally providing an instruction to the pipeline occur while maintaining active system clocks of the microprocessor.

14. The method of claim 12, wherein the internal register is an architected register of the microprocessor that is accessible via the microprocessor's instruction set.

15. A microprocessor, comprising:
- a serial communication bus including an address line and a data line, the serial communication bus being within the processor and accessible through an external port;
- an execution pipeline including a first and second stage, the first stage being enabled to pass an instruction to the second stage;
- a register satellite circuit coupled to the address and data lines of the communication bus and being addressable on the communication bus via a first unique address;
- a dedicated interface register coupled to the register satellite circuit and the execution pipeline, the interface register being dedicated to transferring data between the execution pipeline and the communications bus via the register satellite circuit; and
- a pipeline satellite circuit coupling the execution pipeline to the address and data lines of the communications bus and being addressable on the communication bus via a second unique address, wherein the register satellite circuit and the pipeline satellite circuit each include a two-wire serial bus data unit and a two-wire serial bus address unit, wherein each two-wire serial bus address unit is connected to the address line, each two-wire serial bus data unit is connected to the data line, and wherein each two-wire serial address unit further includes:
    - an address shift register for serially inputting and serially outputting an address packet on the address line;
    - an address comparator for comparing an address from an address packet received on the address line to the unique address; and
    - a positive acknowledgment generation unit for modifying the address packet to provide a positive acknowledgment of a receipt of the address packet to a source of the address packet; and
- wherein the pipeline satellite circuit enables an external agent to provide a preemptive executable instruction to the second stage of the execution pipeline, wherein the externally provided instruction preempts the instruction from the first stage to the second stage, causing the execution pipeline to write an architected register of the processor to the dedicated interface register or read the dedicated interface register to the architected register, so that the execution pipeline is enabled to access the dedicated interface register during execution of the preemptive instruction and the pipeline satellite circuit and the register satellite circuit enable access of architected registers in the microprocessor through the external port.

* * * * *